Nov. 18, 1958     J. H. McKEWEN     2,860,430
PRESCHEDULING MEANS FOR MACHINE TOOL
Filed Dec. 12, 1955     2 Sheets-Sheet 1
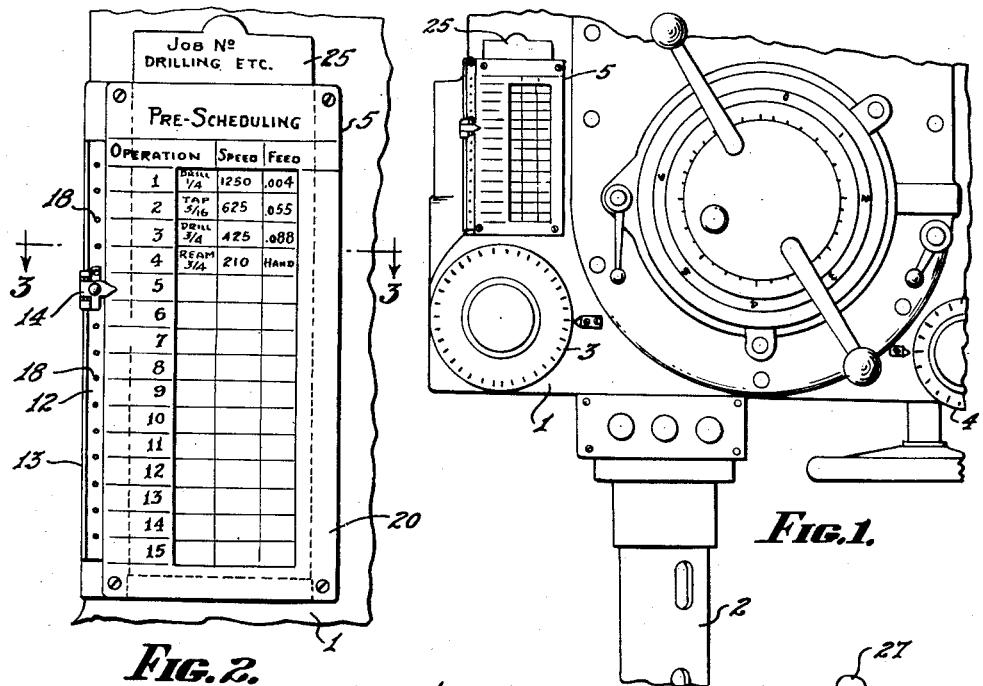
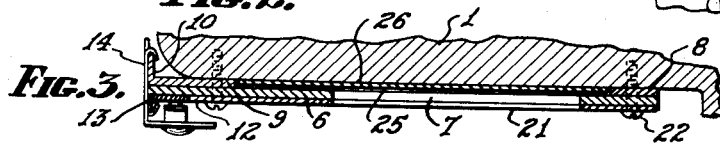
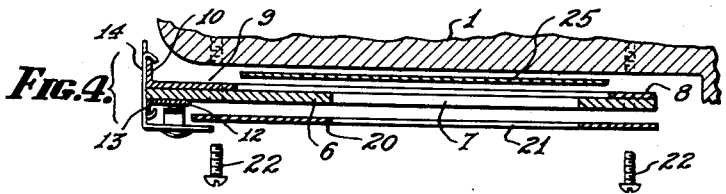
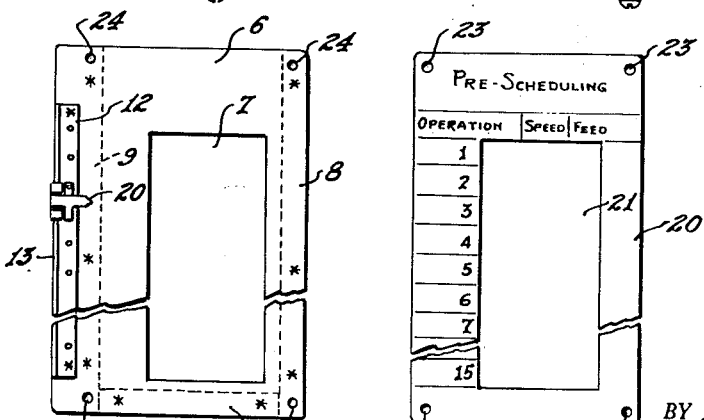
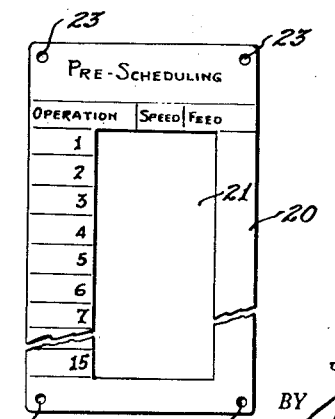
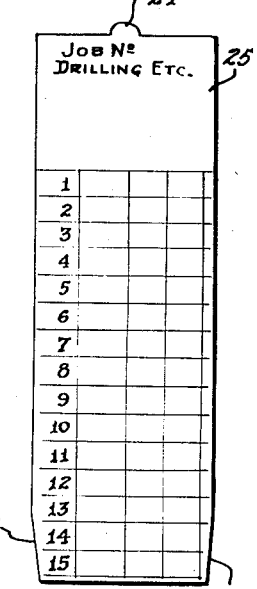
INVENTOR.
JOHN H. McKEWEN,
BY Allen & Allen
ATTORNEYS.

Nov. 18, 1958  J. H. McKEWEN  2,860,430
PRESCHEDULING MEANS FOR MACHINE TOOL
Filed Dec. 12, 1955  2 Sheets-Sheet 2

INVENTOR.
JOHN H. McKEWEN,
BY
ATTORNEYS.

United States Patent Office 2,860,430
Patented Nov. 18, 1958

2,860,430

PRESCHEDULING MEANS FOR MACHINE TOOL

John H. McKewen, Cincinnati, Ohio, assignor, by mesne assignments, to Giddings & Lewis Machine Tool Company, Fond du Lac, Wis., a corporation of Wisconsin Application December 12, 1955, Serial No. 552,575

8 Claims. (Cl. 40—10)

My invention relates to machine tools and more particularly to the provision of prescheduling means for guiding the operator where a series of operations are to be performed upon a workpiece.

In the description which follows I shall describe my invention as it is used in conjunction with a radial drill, although as the description proceeds it will become apparent that the device will find utility in connection with other types of machine tools capable of successively performing a series of operations upon a workpiece.

A modern radial drill will have as many as thirty-six speeds and eighteen feeds for performing various operations under a wide range of operating conditions. In the proper use of such machine, it is highly desirable to plan the sequence of operations to be performed and guide the operator in properly selecting the speeds and feeds for succeeding operations. Such prescheduling or programing is necessary if the machine is to be utilized to its maximum advantage; and yet to the best of my knowledge no one has heretofore provided a simple and inexpensive prescheduling device which will indicate the proper sequence of operations to be performed and guide the operator in selecting the proper speeds and feeds for those operations, while at the same time providing a permanent record of tool diameter and other pertinent information relating to the operations being performed.

It is, therefore, a principal object of my invention to provide a simple and inexpensive prescheduling means which is readily accessible to the operator for guiding him in the proper operations of the machine.

A further object of my invention is the provision of a prescheduling device in the form of an indicator forming a permanent part of the machine, the indicator being constructed and arranged to selectively receive job cards containing information covering various series of operations which are to be performed.

A further object of my invention is the provision of an indicator of the character described which incorporates a movable pointer by means of which the operator may indicate which of a series of operations is being performed by the machine. Such pointer is of particular utility following shut-downs or rest periods or during changes in operators.

Still a further object of my invention is the provision of an indicator having a removable face plate which may be readily exchanged for another face plate bearing different indicia should the particular machine be designated for special job use. Yet the arrangement of parts is such that the pointer forming a part of the indicator may be used irrespective of the face plate employed.

Yet a further object of my invention is the provision of a prescheduling device comprising a base and a face plate, the base being constructed and arranged to coact with a surface of the machine tool to form a job card receiving pocket.

These as well as other objects of my invention which will appear hereinafter or which will be apparent to the skilled worker in the art upon reading these specifications, I accomplish by that construction and arrangement of parts of which I shall now describe certain exemplary embodiments.

Reference is now made to the accompanying drawings wherein:

Figure 1 is a partial front elevational view of a tool head for a radial drill incorporating my invention.

Figure 2 is an enlarged partial elevational view illustrating a prescheduling device in accordance with my invention.

Figure 3 is a sectional view taken along the line 3—3 of Figure 2.

Figure 4 is a sectional view similar to Figure 3 but with the parts in exploded relation.

Figure 5 is a plan view of a job card for use with the device of Figure 2.

Figure 6 is an elevational view of the base plate and pointer forming a part of the device.

Figure 7 is a front elevational view of the face plate for my device.

Figure 8:
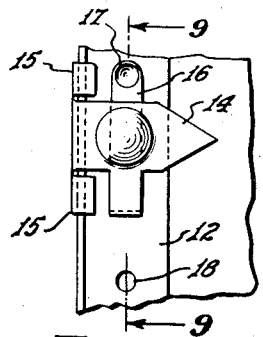
Figure 8 is an enlarged fragmentary view of the pointer mechanism.

Referring now to Figure 1 of the drawings, I have therein illustrated the tool head 1 of a radial drill, the tool head including a spindle 2 the operation of which is controlled by a cutting speed control means 3 and a feed control means 4. It will be understood that the speed control means will control the speed of rotation of the spindle and, as indicated previously, may incorporate as many as thirty-six different speeds. Similarly, the feed control means 3 will control the feeding speed or advance of the spindle, which also may be set to operate at any one of a large number of feeding speeds. One of the principal purposes of the prescheduling device is to advise the operator as to what type of tool is to be mounted on the spindle and at what speed and feed it is to be operated for successive operations on the workpiece. The prescheduling device is indicated at 5, and it will be noted that the device may be conveniently mounted on the tool head in close proximity to the control means 3 and 4, so that the operator may readily view it and set the controls accordingly.

The principal components of the prescheduling device comprise a base 6 of elongated rectangular configuration, the base having a vertically elongated opening therein spaced from the edges of the base. Longitudinally disposed spacers 8 and 9 are secured to the rear surface of the base and extend along the opposite side edges thereof, the spacer 9 terminating along its outermost edge in an angularly related rearwardly projecting flange 10. Preferably, the spacers 8 and 9 will be spot welded or otherwise permanently secured to the base plate. A laterally disposed spacer 11 extends along the bottom edge of the base between the longitudinal spacers 8 and 9.

Figure 9:
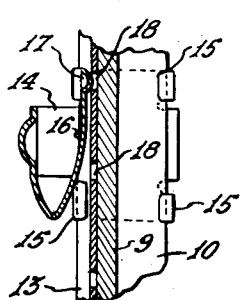
Figure 9 is a vertical sectional view taken along the line 9—9 of Figure 8.
Figure 10:
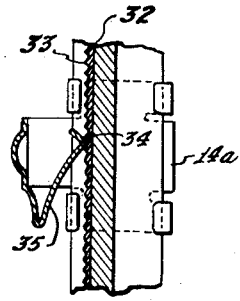
Figure 10 is a vertical sectional view similar to Figure 9 but illustrating an alternative form of the invention.

A guide strip 12 is fixedly secured, as by spot welding, to the face of the base, the guide strip extending along the longitudinal side edge of the base opposite the spacer 9. The guide strip is provided with an outturned flange 13 which coacts with the flange 10 of the spacer 9 to provide a track along which the pointer 14 is adapted to slide. As best seen in Figure 9, the pointer 18 is provided with a plurality of reversely turned ears 15 which engage about the flanges 10 and 13 to permit sliding movement of the pointer therealong. In addition, the pointer incorporates a resilient arm 16 adapted to bear against the surface of the strip 12, the arm having a dimple 17 adapted to be selectively engaged in the spaced apart recesses or openings 18 extending along the length of the strip 12. This arrangement serves to maintain the pointer in fixed position until positive force is applied to move it to another position.

A face plate 20 is adapted to overlie the base 6, the face plate abutting along one side edge against the guide strip 12 and having an elongated opening 21 therein adapted to coincide with the opening 7 in the base. Both the face plate 20 and the base 6 may be conveniently secured to the tool head 1 by means of screws 22 adapted to pass through openings 23 in the corners of the face plate and mating openings 24 in the corners of the base. Preferably, the openings in the base will also pass through the upper and lower ends of the spacers 8 and 9, in the manner illustrated.

As will be apparent from Figures 2 and 7 of the drawings, the face plate 20 will carry indicia which is etched, embossed, or otherwise applied to the face plate. The indicia on the face plate is intended to coact with indicia contained on a job card 25 adapted to be received in the narrow pocket 26 formed between the surface of the tool head 1 and the rear surface of the base 6, the spacers 8, 9 and 11 forming the ends and bottom, respectively, of the card receiving pocket. As best seen in Figure 5, the job card will be divided into suitable spaces for receiving indicia pertaining to the operation of the machine and this indicia, when the card is fitted in the pocket 26, will be oriented with respect to the indicia on the face plate 20, in the manner best seen in Figure 2. The job card, it will be noted, is of a size to just nicely fit in the pocket with its upper end projecting upwardly beyond the prescheduling device. Preferably, the job card will be provided with a flexible tab 27 to facilitate its removal from the pocket. It is also preferred to taper the lower edges of the card inwardly, as indicated at 28 and 29, to facilitate the insertion of the card into the pocket. It will be obvious that separate job cards will be provided for each series of operations to be performed by the machine.

In the operation of my device, the proper job card will be inserted into the pocket 26, whereupon the operator will move the pointer 14 adjacent the indicia indicating the first operation to be performed, the arm of the pointer engaging in the adjacent opening 18 to thereby secure the pointer against accidental movement. The operator can then set the speed and feed of the machine in accordance with the indicia on the job card and select the proper tool for the operation to be performed. Upon completion of the first operation, the operator will move the indicator adjacent the indicia indicating the second operation to be performed, whereupon the machine will be set in accordance with the job card. It will be apparent that the device will not only provide a readily available schedule of pertinent information concerning the operation to be performed, but in addition the pointer will serve to indicate which of a series of operations is being performed. Thus, should the operator leave the machine for any reason, or a new operator take over its operation, a visible record will be readily available to indicate the status of the piece of work being acted upon and the condition of the machine. In addition, where pre-selectivity of speeds and feeds is incorporated in the drill head, as illustrated in Figure 1, the operator, by referring to the indicia, can pre-select his next speed and also prepare the next tooling setup while the machine is doing an operation. When the operation is completed the operator need only to change tools and start the next operation; thus speeding up the productivity of the machine.

Figure 11:
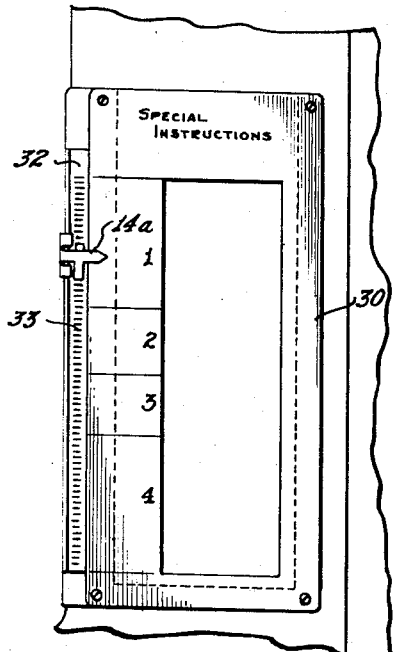
Figure 11 is a front elevational view similar to Figure 2 illustrating a modified form of the invention incorporating the pointer of Figure 10.
Figure 12:
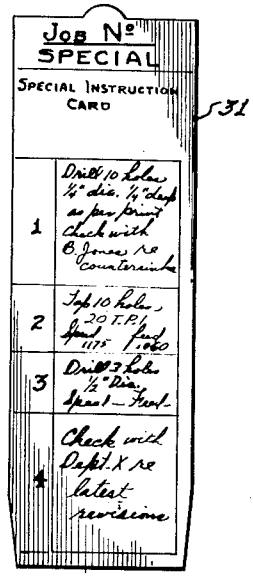
Figure 12 is a plan view of a job card for use with the device of Figure 11.

Modifications may be made in my invention without departing from the spirit of it. For example, in Figure 11 I have indicated an alternate form of face plate 30 which may be substituted for the face plate 20. The face plate 30 is intended for use for special operations which may require detailed instructions accompanying one or more of the operations. To this end, the indicia of the face plate will be altered accordingly, and the job card 31, illustrated in Figure 12, will be printed to correspond to the indicia on the special face plate.

It is also contemplated that the spaced apart openings or recesses 18 in the guide strip 12 may be replaced by a guide strip 32 having a serrated or toothed surface 33 adapted to be selectively engaged by the pointed edge 34 of the resilient arm 35 forming a part of the pointer 14a. This arrangement provides for closer adjustment of the pointer than can be obtained by means of the spaced apart openings 18 and is particularly suited for use where unequal spacing of the indicia on the face plate is encountered. Other modifications which will be apparent to the skilled worker in the art may also be made without departing from the spirit and purpose of my invention.

Having, however, described my invention in certain exemplary embodiments, what I desire to protect and secure by Letters Patent is:

1. In a prescheduling device for the purposes described, a base member comprising an elongated generally rectangular body, spacing members extending along the opposite sides and bottom of the rear surface of said base member, the rear surface of said base member, said spacers and the surface to which said base is secured defining a job card receiving pocket, an elongated opening in said base member in the area of said pocket, pointer mounting means extending along an edge of said base member, a pointer movably mounted on said mounting means and movable relative to the opening in said base member, means for securing said pointer in predetermined fixed position, and a face plate covering said base member, said face plate having an opening therein overlying the opening in said base member.

2. In a prescheduling device for the purposes described, a base member comprising an elongated generally rectangular body, spacing members extending along the opposite sides and bottom of the rear surface of said base member, the rear surface of said base member, said spacers and the surface to which said base is secured defining a job card receiving pocket, an elongated opening in said base member in the area of said pocket, a guide strip extending along a side edge of the front surface of said base member opposite one of said spacers, said last named spacer and said guide strip having oppositely directed flanges defining a track extending along the side edge of said base member, a pointer movably mounted on said track, and means for securing said pointer in predetermined fixed position.

3. In a prescheduling device for the purposes described, a base member comprising an elongated generally rectangular body, spacing members extending along the opposite sides and bottom of the rear surface of said base member, the rear surface of said base member, said spacers and the surface to which said base is secured defining a job card receiving pocket, an elongated opening in said base member in the area of said pocket, a guide strip extending along a side edge of the front surface of said base member opposite one of said spacers, said last named spacer and said guide strip having oppositely directed flanges defining a track extending along the side edge of said base member, a pointer movably mounted on said track, said pointer including a resilient arm contacting said guide strip, and means on said guide strip for engagement by said arm to secure said pointer in predetermined fixed position.

4. The structure claimed in claim 3 wherein said arm includes a dimple, and wherein the means on said guide track comprises a plurality of spaced apart openings selectively engageable by said dimple.

5. The structure claimed in claim 3 wherein said arm includes a pointed edge contacting said guide strip, and wherein the means on said guide strip for engaging said arm comprises a plurality of serrations extending along the path of said arm.

6. In a prescheduling device for the purposes described, a base member comprising an elongated generally rectangular body, spacing members extending along the opposite sides and bottom of the rear surface of said base member, the rear surface of said base member, said spacers and the surface to which said base is secured defining a job card receiving pocket, an elongated opening in said base member in the area of said pocket, pointer mounting means extending along an edge of said base member, a pointer movably mounted on said mounting member and movable relative to the opening in said base member, there being indicia carried by said base member adjacent said opening, in combination wtih a job card inserted in said pocket and seated at its lower end against the spacer at the bottom of said body member, said job card having indicia printed thereon in alignment with the indicia carried by said base member.

7. The combination claimed in claim 6 wherein said job card is of a length to project upwardly beyond the upper edge of said base member, and wherein said job card carries a tab on its upper edge.

8. The combination claimed in claim 6 wherein the lower portions of the side edges of said job card are tapered inwardly, whereby the said card may be readily inserted in the pocket in said device.

References Cited in the file of this patent

UNITED STATES PATENTS

| | | |
|---|---|---|
| 1,714,929 | Smith | May 28, 1929 |
| 2,170,293 | Carter | Aug. 22, 1939 |
| 2,652,804 | Pegard | Sept. 22, 1953 |